United States Patent
Kihara

(10) Patent No.: US 10,997,854 B2
(45) Date of Patent: May 4, 2021

(54) PARKING LOT MANAGEMENT SYSTEM

(71) Applicant: DAITO TECHNOLOGIES CO., LTD., Tokyo (JP)

(72) Inventor: Satoshi Kihara, Tokyo (JP)

(73) Assignee: DAITO TECHNOLOGIES CO., LTD., Tokyo (JP)

( * ) Notice: Subject to any disclaimer, the term of this patent is extended or adjusted under 35 U.S.C. 154(b) by 60 days.

(21) Appl. No.: 16/502,800

(22) Filed: Jul. 3, 2019

(65) Prior Publication Data
US 2020/0013282 A1    Jan. 9, 2020

(30) Foreign Application Priority Data

Jul. 4, 2018    (JP) .............................. JP2018-127646

(51) Int. Cl.
*G08G 1/065*    (2006.01)
*G08G 1/017*    (2006.01)
(Continued)

(52) U.S. Cl.
CPC ....... *G08G 1/0175* (2013.01); *G06K 9/00771* (2013.01); *G06K 9/325* (2013.01);
(Continued)

(58) Field of Classification Search
CPC .......... G08G 1/04; G08G 1/014; G08G 1/017; G08G 1/065; G08G 1/142; G08G 1/144;
(Continued)

(56) References Cited

U.S. PATENT DOCUMENTS

| | | | | |
|---|---|---|---|---|
| 9,818,154 | B1* | 11/2017 | Wilbert | .................. G06K 9/325 |
| 2014/0210646 | A1* | 7/2014 | Subramanya | ...... G06K 9/00812 |
| | | | | 340/928 |
| 2014/0214500 | A1* | 7/2014 | Hudson | .............. G06Q 30/0284 |
| | | | | 705/13 |

FOREIGN PATENT DOCUMENTS

| | | |
|---|---|---|
| JP | 2007-317098 A | 12/2007 |
| JP | 2012-094134 A | 5/2012 |

(Continued)

OTHER PUBLICATIONS

Office Action issued by the Japan Patent Office dated Sep. 25, 2018 for patent application No. JP2018-127646.

(Continued)

*Primary Examiner* — Matthew C Bella
*Assistant Examiner* — Kathleen M Broughton
(74) *Attorney, Agent, or Firm* — Taro Yaguchi

(57) ABSTRACT

To provide a parking lot management system capable of maintaining a high vehicle number recognition rate even with reduced camera performance. A parking lot management system 1 comprises a parking lot system 10 installed in a parking lot, and a server device 30 connected thereto by a network 2. The parking lot system 10 comprises a camera unit 11, and the server device 30 comprises a server-side control means 31, server-side memory 32, a data analysis means 33, and a server-side communication means 34. The camera unit 11 comprises a camera-side control means 13, a flashlight 14, an indicator 15 for indicating that a space is occupied, a camera 16, camera-side memory 17, and a camera-side communication means 18. Because the data analysis means 33 of the server device 30 has high analytical power, a low-performance camera 16 is sufficient for the camera unit 11.

2 Claims, 5 Drawing Sheets

(51) Int. Cl.
   *G08G 1/04* (2006.01)
   *G06K 9/32* (2006.01)
   *G08G 1/14* (2006.01)
   *G06K 9/00* (2006.01)
(52) U.S. Cl.
   CPC .............. *G08G 1/04* (2013.01); *G08G 1/065* (2013.01); *G08G 1/146* (2013.01); *G08G 1/149* (2013.01)
(58) Field of Classification Search
   CPC ........ G08G 1/146; G08G 1/148; G08G 1/149; G08G 1/175; G06K 9/00771; G06K 9/325; G06Q 50/30; G07B 15/02
   See application file for complete search history.

(56) References Cited

FOREIGN PATENT DOCUMENTS

| | | |
|---|---|---|
| JP | 5988184 A | 8/2016 |
| JP | 2017-045384 A | 3/2017 |

OTHER PUBLICATIONS

Office Action issued by the Japan Patent Office dated Jan. 15, 2019 for patent application No. JP2018-127646.

\* cited by examiner

FIG.5
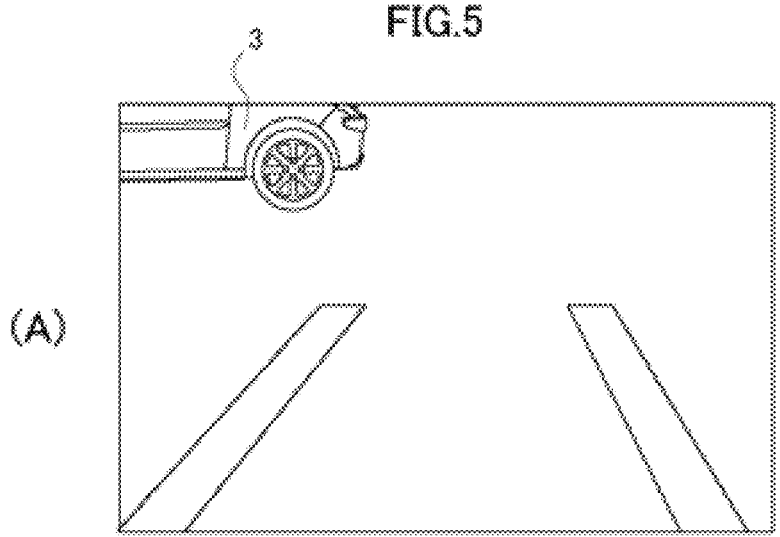
(A)
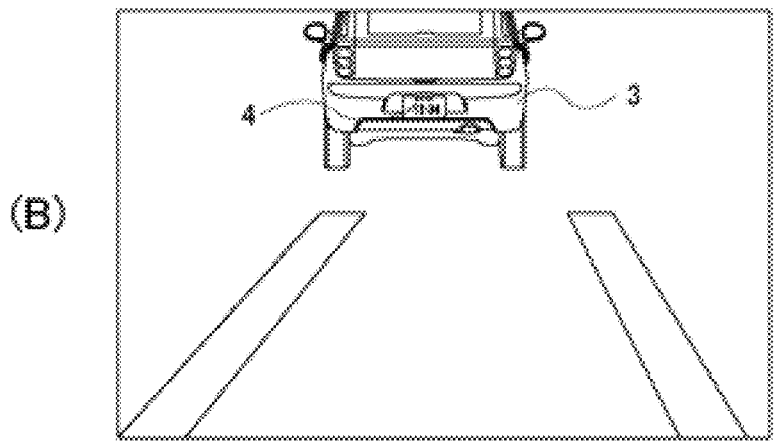
(B)
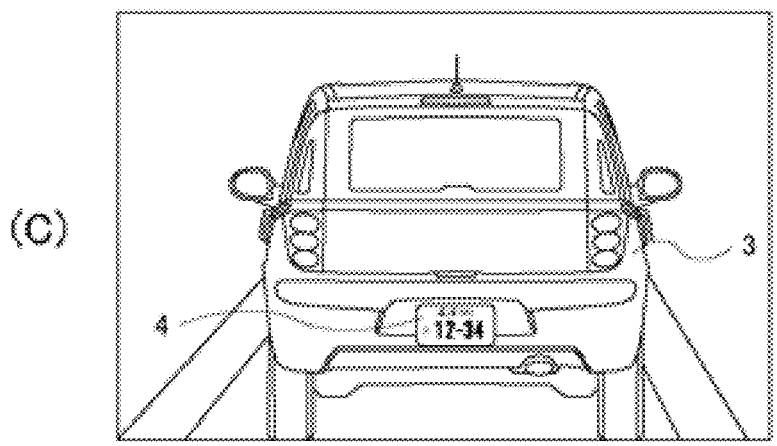
(C)

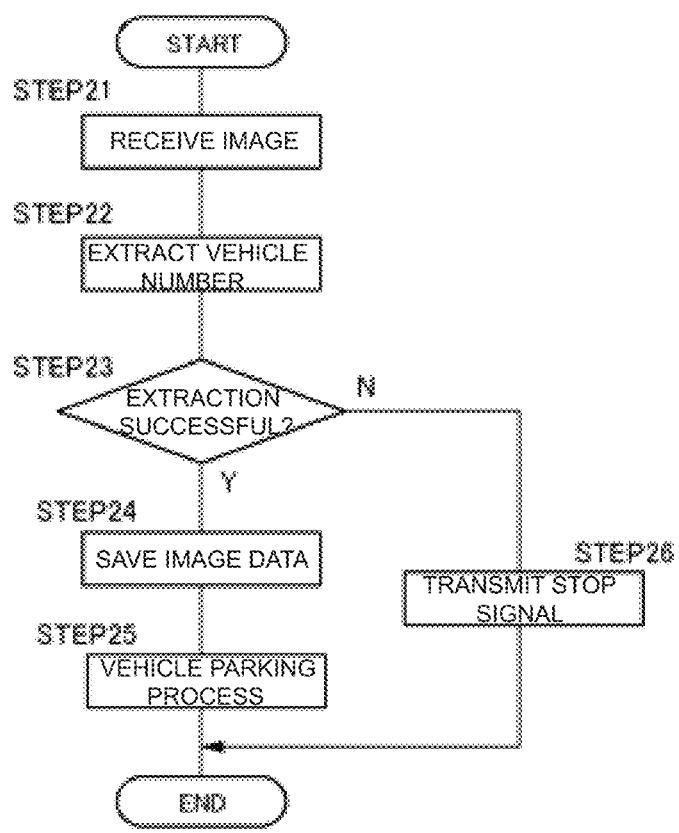

PARKING LOT MANAGEMENT SYSTEM

FIELD OF THE INVENTION

The present invention pertains to a parking lot management system that photographs vehicles to recognize vehicle numbers in a paid parking lot or the like.

BACKGROUND OF THE INVENTION

Systems are known in which an image of a vehicle wishing to park in a paid parking lot or the like is photographed and the vehicle number displayed on the license plate is recognized to determine whether the vehicle wishing to park is a preregistered vehicle (see Patent Reference 1).

In accordance with the system disclosed in Patent Reference 1, there is provided a parking lot management system wherein the regions of an image of a vehicle number captured by a camera are divided into a place name section, a class number section, a use display section, and a unique number section, the system having a high recognition rate, even if some reading errors occur, and placing as little burden as possible on the driver for confirmation, etc.

PRIOR ART REFERENCE

Patent Reference 1: Japan Patent No. 5988184

SUMMARY OF THE INVENTION

Meanwhile, in order to maintain a high recognition rate in parking lot management systems of this sort, a high-performance camera, a high-processing-power CPU for rapidly processing images, high-capacity memory, and the like are needed for camera units.

Radar, infrared sensors, or the like are also used in conventional parking lot management systems of this sort in order to detect the approach of vehicles to the parking area. Consequently, these sensors must be provided in the camera units in conventional systems.

In addition, because the same number of parking lot camera units and radars or other sensors as the number of parking spaces is required, a parking lot having many parking spaces will also have a large number of camera units, thereby inconveniently increasing the number of components in the system as a whole.

In order to eliminate the inconvenience described above, an object of the present invention is to provide a parking lot management system that does not require high-performance cameras, and is capable of maintaining a high vehicle number recognition rate regardless of camera performance. Another object of the present invention is to provide a parking lot management system that recognizes vehicle numbers without the need for detectors such as radars.

In order to achieve the objects proposed above, a parking lot management system according to the present invention is characterized by comprising a camera unit installed in a parking lot, and a server device connected to the camera unit over a network;

the camera unit comprising: a digital camera; camera-side memory for saving photograph data obtained by the camera; a camera-side communication means for external communication; and a camera-side control means for controlling the camera, the camera-side memory, and the camera-side communication means;

the server device comprising: a server-side communication means for external communication; server-side memory for storing the photograph data; a data analysis means for analyzing the photograph data; and a server-side control means for controlling the server-side communication means, the server-side memory, and the data analysis means;

the camera unit being provided for each parking space in the parking lot;

the data analysis means of the server device having the ability to recognize characters contained in the photograph data photographed by the camera;

the camera-side control means acquiring photograph data using the camera when a vehicle is detected approaching the parking space, and transmitting the photograph data to the server device via the camera-side communication means; and the server device acquiring the photograph data transmitted from the camera unit via the server-side communication means, and the data analysis means performing an extraction process of extracting a vehicle number from the photograph data.

In accordance with the parking lot management system of the present invention, the vehicle number is extracted not by the camera unit, but on the server device side. In accordance with this arrangement, the data analysis means of the server device has the ability to recognize characters included in the photograph data photographed by the camera, enabling the vehicle number to be extracted even if the camera of the camera unit has low performance.

In the parking lot management system according to the present invention, the camera-side control means preferably uses the camera to detect a vehicle approaching the parking space. In accordance with this arrangement, a vehicle approaching a parking space is detected by the camera, eliminating the need for a vehicle detection means, such as a radar, other than the camera. If a radar or the like were used as a vehicle detection means, a number thereof corresponding to the number of parking spaces would be necessary; however, this is unnecessary in the present invention. In accordance with the parking lot management system according to the present invention, it is thus possible to reduce the number of components in the system as a whole.

The parking lot management system according to the present invention is also characterized in that, after the photograph data has been transmitted, the camera unit starts a parking process including notifying a user that usage has begun, or starting to count usage time. In accordance with this arrangement, it is possible to begin the parking process immediately after the camera has photographed and transmitted photograph data.

In the parking lot management system according to the present invention, the server-side control means preferably transmits a signal to stop the parking process to the camera unit if it cannot be confirmed in the extraction process that a vehicle has entered the parking lot.

It is conceivable that, although the camera may detect a vehicle approaching the parking space, the vehicle does not park, but instead leaves the parking space; in such cases as well, a signal to stop the parking process is transmitted if it cannot be confirmed that the vehicle has been parked, thereby stopping the parking process and allowing the system to wait for a new user.

BRIEF DESCRIPTION OF THE DRAWINGS

FIG. 5 is (A)-(C) Illustrations of examples of photograph data obtained by a camera;

FIG. 6 is a flowchart of server-device-side operation.

DETAILED DESCRIPTION OF THE INVENTION

Figure 1:
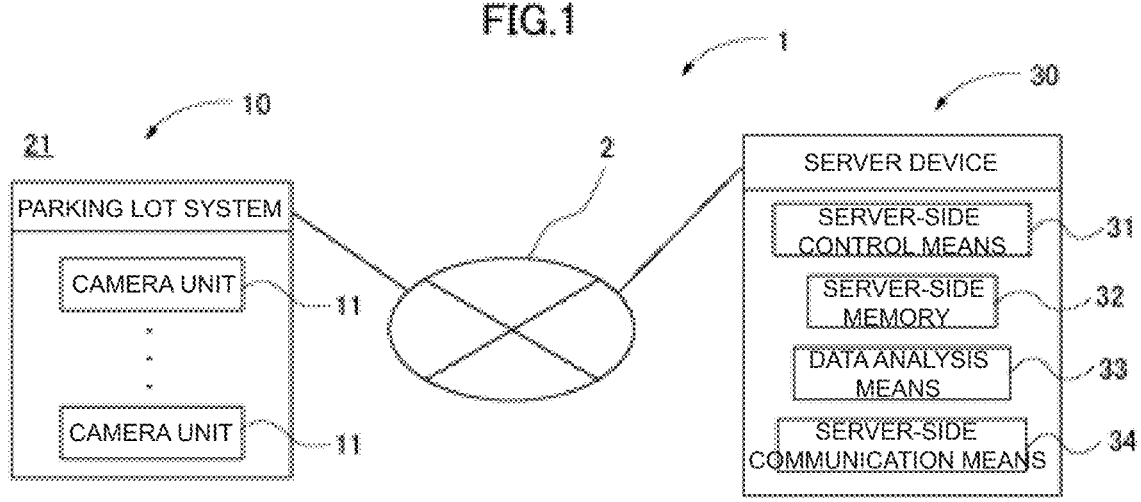
FIG. 1 is an illustration of the overall configuration of the parking lot management system according to the present invention.
Figure 2:
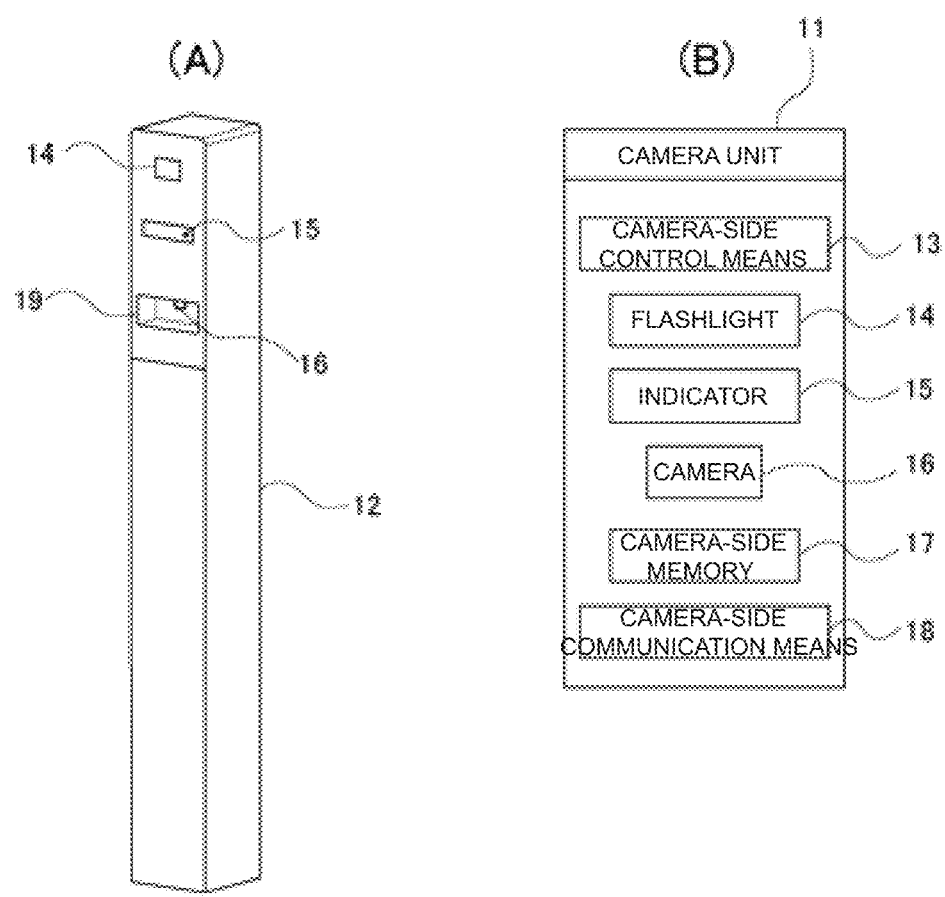
FIG. 2 is (A) An illustration of a post-shaped form; (B) an illustration of the functional configuration of a camera unit.

Next, an embodiment of the parking lot management system according to the present invention will be described with reference to FIGS. 1-6. As shown in FIG. 1, a parking lot management system 1 comprises a parking lot system 10, installed in a parking lot 21, and a server device 30 connected thereto by a network 2.

Figure 3:
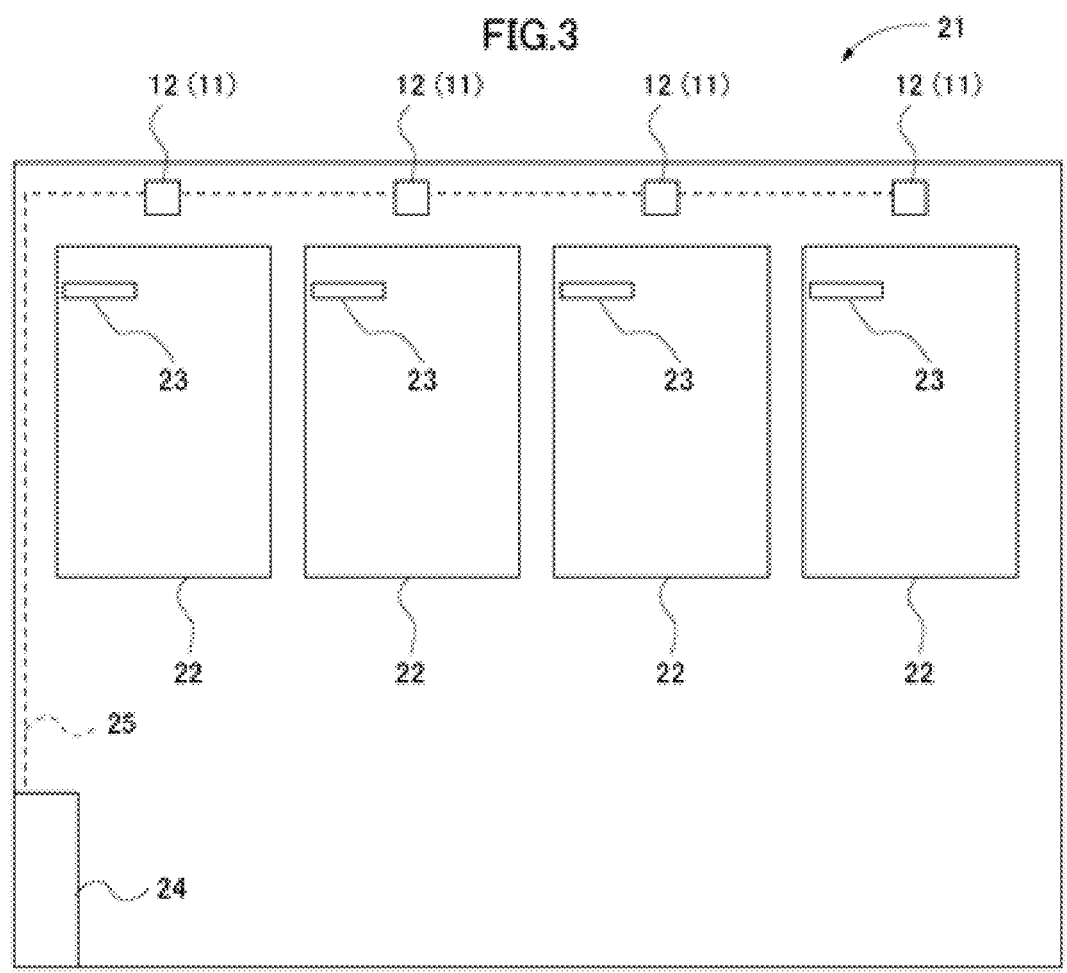
FIG. 3 is an illustration of the configuration of a parking lot.

The parking lot system 10 comprising a plurality of camera units 11 corresponding to the number of available parking spots (see FIG. 3). The server device 30 comprises a server-side control means 31, server-side memory 32, a data analysis means 33, and a server-side communication means 34.

As shown in FIG. 2(A), the camera unit 11 is built into a post 12, referred to as a camera pole, installed in the parking lot 21. As shown in FIGS. 2(A) and (B), the camera unit 11 comprises a camera-side control means 13, a flashlight 14, an indicator 15 for indicating that a space is occupied, a general-performance digital camera 16, camera-side memory 17 for storing photograph data photographed by the camera 16, and a camera-side communication means 18.

As shown in FIG. 2(A), the post 12 is formed in a rectangular prism shape in the present embodiment, and comprises, from top down, the flashlight 14, the indicator 15, and the camera 16 in a surface within a camera space 19. A circuit board (not shown) on which the camera-side control means 13, the camera-side memory 17, etc., are mounted is built into the interior of the post 12.

In the post 12 in the present embodiment, the camera space 19 is formed in a recessed shape from the surface of the post 12. In the present embodiment, the provision of the camera space 19 in the post 12 protects the camera 16 from the elements and external impacts.

The camera-side control means 13 in the camera unit 11 is a computer constituted by a CPU, etc., and controls the camera 16, etc. The camera-side control means 13 handles data from a general-purpose camera 16, and thus does not need to be high-performance. It is thus possible to reduce the costs of the camera unit 11 as a whole.

In addition, because the camera 16 is general-performance, the flashlight 14, indicator 15, camera-side memory 17, and camera-side communication means 18 also need not be high-performance, and general-purpose parts currently in common use can be used for these elements.

As shown in FIG. 3, the parking lot 21 comprises parking spaces 22, parking blocks 23 provided in the parking spaces 22, posts 12 provided in the rears (toward the top in FIG. 3) of the parking spaces 22, and a payment unit 24 provided in a corner of the parking lot 21. In FIG. 3, the parking spaces 22 indicate rectangular areas, but need not be particularly delineated as long as they are areas in which a vehicle 3 is parked.

As shown in FIG. 3, each post 12 is connected to the payment unit 24 by a network cable 25. The payment unit 24 is connected to the network 2 by a communication means not shown in the drawings. Each post 12 may be connected to the payment unit 24 by a network cable 25 in this way, or connected to the payment unit 24 or the server device 30 via a means such as a wireless LAN.

Figure 4:
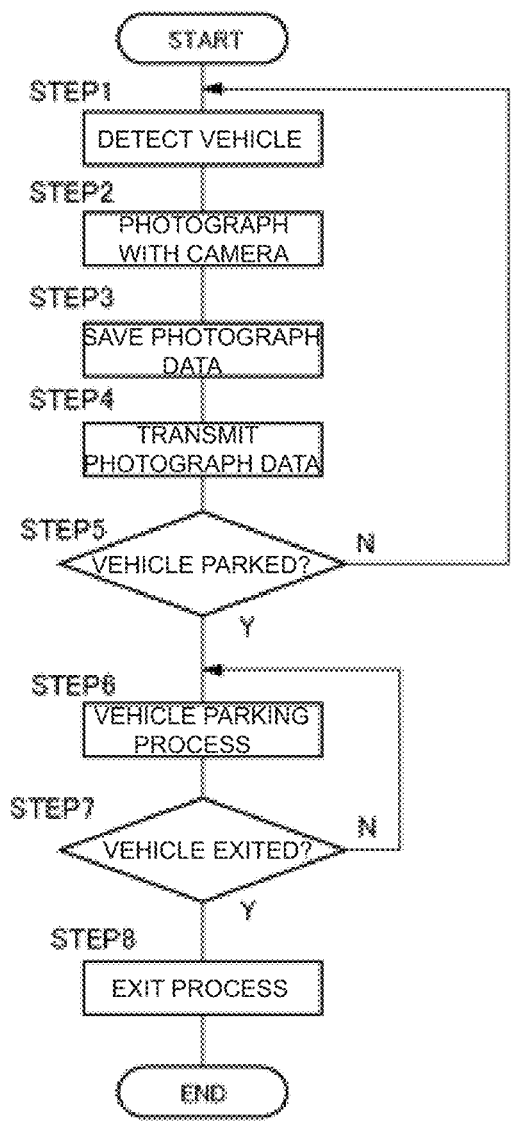
FIG. 4 is a flowchart of camera-unit-side operation.

Next, the operation of the parking lot management system 1 according to the present embodiment will be described with reference to FIGS. 4-6. In the parking lot 21, the cameras 16 installed in the posts 12 constantly operate, and the camera-side control means 13 monitors for any change in the photograph data photographed by the cameras 16.

When a vehicle 3 approaches, the vehicle 3 appears in an image which the vehicle 3 was not previously visible, as shown in FIG. 5(A). At this time, the camera-side control means 13 compares images in which the vehicle 3 is not visible and images in which the vehicle 3 is visible to detect the approach of the vehicle 3 to a parking space 22 (STEP 1).

After the vehicle 3 has been detected, the camera-side control means 13 uses the camera 16 to photograph an image. This is in order to acquire an image of a vehicle number 4 of the vehicle 3 approaching the parking space 22 by photographing the vehicle 3. The required number of frames of photograph data while the vehicle 3 is moving from FIG. 5(B) to FIG. 5(C) is acquired for as photograph data.

Specifically, in the state shown in FIG. 5(B), a first image is photographed by the camera 16 (STEP 2). FIG. 5(C) is an example of photographed photograph data. Next, the photograph data is stored in the camera-side memory 17 (STEP 3).

When steps 2 and 3 have been performed, the camera-side control means 13 transmits the photograph data stored in the camera-side memory 17 to the server device 30 via the camera-side communication means 18 (STEP 4). At this time, the camera-side communication means 18 preferably transmits the photograph data in compressed form.

Next, if a stop signal as described hereafter is not transmitted to the camera unit 11 from the server device 30 within a specific length of time (for example, five seconds) after the photograph data has been transmitted, the vehicle 3 is recognized as having been parked (Y in STEP 5), and a vehicle parking process is begun (STEP 6). The vehicle parking process is a process wherein the indicator 15 of the post 12 is lit to notify the user that a usage time count has been started (usage has started). Also, the vehicle parking process includes a process of charging a parking fee.

Apart from this process, the payment unit 24 performs a fee charging process for each of the parking spaces 22 in the present embodiment. For example, if a user is a previously registered user, a fee corresponding to parking time can be paid using a payment means in the registered information for the registered user.

In this way, when the vehicle 3 leaves the state of being parked in the parking, the movement of the vehicle 3 is detected from the photograph data obtained by the camera 16 (Y in STEP 7), and an exit process is performed (STEP 8). The exit process is a process that includes charging the user with a fee, resetting the equipment in anticipation of the next user, etc.

Next, the operation of the server device 30 will be described with reference to FIG. 6. When photograph data has been transmitted from the camera unit 11 and received by the server-side communication means 34 (step 21), the data analysis means 33 performs a vehicle number 4 extraction process (STEP 22).

Processing is performed so that the data analysis means 33 can extract the vehicle number 4 from the photograph data. The data analysis means 33 has the ability to recognize characters contained in the photograph data photographed by the camera 16.

If the camera 16 has low performance, data analysis will be impossible unless the data analysis means 33 has high analysis capability. Conversely, if the camera 16 is relatively high-performance, data analysis is possible even if the data analysis means 33 has low analysis capability. The extraction method disclosed in Japanese Patent No. 5988184 constituting Patent Reference 1, for example, can be used as the specific method of extracting the vehicle number 4.

If the vehicle number 4 is successfully extracted (Y in STEP 23), photograph data is stored in the server-side memory 32 (STEP 24). Next, the server device 30 performs the vehicle parking process (STEP 25). In the vehicle parking process performed by the server device 30, the registered information is updated (number of times used increased, etc.) if the user is a registered user.

If the vehicle number 4 is not successfully extracted (N in STEP 23), the server-side control means 31 transmits a stop signal to the camera unit 11 (STEP 26). As a result, the camera unit 11 receives a signal indicating that it could not be confirmed that the vehicle 3 has been parked (N in STEP 5), and the process therefore returns to STEP 1 and continues vehicle detection.

In this way, the camera unit 11 in the present embodiment uses a general-performance camera 16 and a camera-side control means 13 comprising a general-purpose CPU to acquire photograph data, the photograph data is transmitted to the server device 30, and data analysis is performed in the server device 30.

This arrangement allows the minimum necessary amount of data to be handled on the camera unit 11 side, thereby allowing low-performance devices to be used. Meanwhile, even if the latest technology is adopted for the server device 30 with every advance in data analysis technology, there is no need for multiple such devices as in the case of the camera units 11, thus making it possible to minimize increases in system costs.

Moreover, there is no need to use a vehicle detection device such as a radar in the camera unit 11 of the parking lot management system 1 according to the present embodiment. It is thus possible to reduce the number of components in the numerous camera units 11.

In this way, the parking lot management system 1 according to the present invention minimizes the number of components in the camera units 11, of which multiple units are required, and it is sufficient to construct a high-performance system for the server device 30, thereby making the system easier to adopt.

While a general-performance camera is used as the camera 16 in the embodiment described above, the present invention is not limited thereto, and a comparatively high-performance camera can be used, as necessary. In particular, since camera performance is constantly improving as part of regular advances in technology, a camera having a level of performance that makes sense from the perspective of cost may be used as the camera in the present invention.

While the camera 16 photographs a plurality of images in the embodiment described above, any number of images can be set. While the post 12 has the shape of a rectangular prism in the embodiment described above, any shape is possible. For example, the post may be cylindrical, or have the shape of a rectangular prism on top of a cylinder.

While a payment unit 24 is installed in the parking lot 21 in the embodiment described above, the present invention is not limited thereto, and the need for a payment unit 24 can be eliminated by paying parking fees entirely via smartphone or a web-based system. Meanwhile, the embodiment may also be provided with a loop coil for detecting vehicles 3 as in existing systems, and flaps restricting the entrance and exit of vehicles 3 may be installed on the ground.

REFERENCE NUMBERS

1 . . . Parking lot management system, 2 . . . network, 3 . . . vehicle, 4 . . . vehicle number, 10 . . . parking lot system, 11 . . . camera unit, 12 . . . post, 13 . . . camera-side control means, 14 . . . flashlight, 15 . . . indicator, 16 . . . camera, 17 . . . camera-side memory, 18 . . . camera-side communication means, 19 . . . camera space, 21 . . . parking lot, 22 . . . parking space, 24 . . . payment unit, 25 . . . network cable, 30 . . . server device, 31 . . . server-side control means, 32 . . . server-side memory, 33 . . . data analysis means, 34 . . . server-side communication means.

What is claimed is:

1. A parking lot management system characterized by comprising a camera unit installed in a parking lot, and a server device connected to the camera unit over a network;

the camera unit comprising: a digital camera; camera-side memory for saving photograph data obtained by the camera; an indicator indicating parking, a camera-side communication means for external communication; and a camera-side control means for controlling the camera, the camera-side memory, the indicator and the camera-side communication means;

the server device comprising: a server-side communication means for external communication; server-side memory for storing the photograph data; a data analysis means for analyzing the photograph data; and a server-side control means for controlling the server-side communication means, the server-side memory, and the data analysis means;

the camera unit being provided for each parking space in the parking lot;

the data analysis means having the ability to recognize characters contained in the photograph data photographed by the camera;

the camera-side control means acquiring photograph data using the camera when a vehicle is detected approaching the parking space, and transmitting the photograph data to the server device via the camera-side communication means;

the server device acquiring the photograph data transmitted from the camera unit via the server-side communication means, and the data analysis means performing an extraction process of extracting a vehicle number from the photograph data;

the camera unit starting a parking process including starting to count usage time along with notifying a user that usage has begun by the indicator after the photograph data has been transmitted; and the server-side control means transmitting a signal to stop the parking process to the camera unit if a vehicle number cannot be extracted in the extraction process.

2. The parking lot management system according to claim 1, wherein the camera-side control means uses the camera to detect a vehicle approaching the parking space.

* * * * *